(12) United States Patent
Sadaghiany

(10) Patent No.: US 7,299,279 B2
(45) Date of Patent: Nov. 20, 2007

(54) SYSTEM AND METHOD FOR REAL-TIME VIEWING OF MONITORING SYSTEM DATA

(75) Inventor: Afshar Sadaghiany, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 896 days.

(21) Appl. No.: 10/248,239

(22) Filed: Dec. 30, 2002

(65) Prior Publication Data

US 2004/0128377 A1 Jul. 1, 2004

(51) Int. Cl.
*G06F 15/173* (2006.01)

(52) U.S. Cl. .................. 709/224; 701/100; 702/183; 702/187

(58) Field of Classification Search ........... 709/217, 709/219, 223, 224; 370/401; 700/286, 287, 700/290; 726/2, 3, 6, 22; 701/100; 702/188, 702/183, 187; 715/764
See application file for complete search history.

(56) References Cited

U.S. PATENT DOCUMENTS

| | | | |
|---|---|---|---|
| 5,329,465 A | 7/1994 | Arcella et al. | |
| 5,428,555 A | 6/1995 | Starkey et al. | |
| 5,548,528 A | 8/1996 | Keeler et al. | |
| 5,631,825 A | 5/1997 | van Weele et al. | |
| 5,634,039 A | 5/1997 | Simon et al. | |
| 5,838,588 A | 11/1998 | Santoso et al. | |
| 5,854,749 A | 12/1998 | Kellams et al. | |
| 5,854,993 A | 12/1998 | Grichnik | |
| 5,930,315 A | 7/1999 | Morman et al. | |
| 5,995,916 A | 11/1999 | Nixon et al. | |
| 5,999,894 A | 12/1999 | Mederer et al. | |
| 6,029,092 A | 2/2000 | Stein | |
| 6,108,616 A | 8/2000 | Borchers et al. | |
| 6,125,312 A | 9/2000 | Nguyen et al. | |
| 6,147,601 A | 11/2000 | Sandelman et al. | |
| 6,199,018 B1 | 3/2001 | Quist et al. | |
| 6,223,098 B1 | 4/2001 | Cheong et al. | |
| 6,263,255 B1 | 7/2001 | Tan et al. | |
| 6,496,477 B1* | 12/2002 | Perkins et al. | 370/228 |
| 6,721,631 B2* | 4/2004 | Shimizu et al. | 700/287 |
| 6,760,689 B2* | 7/2004 | Follin et al. | 702/188 |
| 6,882,904 B1* | 4/2005 | Petrie et al. | 700/295 |
| 6,901,299 B1* | 5/2005 | Whitehead et al. | 700/22 |
| 6,944,555 B2* | 9/2005 | Blackett et al. | 702/62 |
| 2001/0056544 A1* | 12/2001 | Walker | 713/200 |
| 2002/0029097 A1* | 3/2002 | Pionzio et al. | 700/286 |
| 2002/0159441 A1* | 10/2002 | Travaly et al. | 370/352 |
| 2002/0193969 A1* | 12/2002 | Frantz et al. | 702/188 |
| 2004/0088060 A1* | 5/2004 | Renou et al. | 700/30 |

* cited by examiner

*Primary Examiner*—Frantz B. Jean
(74) *Attorney, Agent, or Firm*—Armstrong Teasdale LLP

(57) ABSTRACT

A method of viewing data of a turbine monitoring system from a remote location is provided. The turbine monitoring system includes a programmable logic controller having an interface rack. In an exemplary embodiment, the method includes supplying an on-site monitoring computer, installing at least one communications gateway card in the interface rack, connecting the on-site monitoring computer to the at least one gateway card by a local area network, and connecting the on-site monitoring computer also to a wide area network.

19 Claims, 2 Drawing Sheets

SYSTEM AND METHOD FOR REAL-TIME VIEWING OF MONITORING SYSTEM DATA

BACKGROUND OF INVENTION

This invention relates generally to systems for monitoring rotary machines such as steam and gas turbines, and more particularly, to systems and methods for real-time viewing of monitoring system data.

As power generation demands have increased, there also has been an increased need for assessing operating conditions of power generation turbine plants. Accurately assessing operating conditions facilitates accurate prediction of potential problems, troubleshooting existing problems, and predicting future power generation shortfalls.

Gas and steam turbines used for power generation include a plurality of sensors which monitor key turbine parameters and associated components, for example, vibrational data, operating temperatures, operating speeds, operating pressures, valve and actuator settings, fuel demand, power generation, operational setting percentages, alarms, and operating states and conditions. The signals generated by the sensors are typically transmitted to a monitoring system within the plant at preset time intervals. At least some known monitoring systems are coupled to local intranets which enable users within the plant to view the data collected. However, the data collected cannot be viewed by remote user computers in real time.

SUMMARY OF INVENTION

In one aspect, a method of viewing data of a turbine monitoring system from a remote location is provided. The turbine monitoring system includes a programmable logic controller having an interface rack. The method includes supplying an on-site monitoring computer, installing at least one communications gateway card in the interface rack, connecting the on-site monitoring computer to the at least one gateway card by a local area network, and connecting the on-site monitoring computer also to a wide area network.

In another aspect, a method of viewing data of a turbine monitoring system from a remote location is provided. The turbine monitoring system includes a programmable logic controller having an interface rack. The method includes creating turbine operating data by the turbine monitoring system, transmitting the operating data to an on-site monitoring computer in real-time via a local area network that connects the on-site monitoring computer to the interface rack of the turbine monitoring system, transmitting the operating data to a remote computer by the onsite monitoring system in real-time via a wide area network that connects the on-site monitoring computer to the remote computer, and viewing the transmitted data at the remote computer.

In another aspect, a system that facilitates viewing data of a turbine monitoring apparatus from a remote location is provided. The turbine monitoring apparatus includes a programmable logic controller having an interface rack. The system includes an on-site monitoring computer, a remote computer, at least one communications gateway card configured to communicate with the turbine monitoring apparatus, a local area network connecting the on-site monitoring computer to the at least one gateway card, and a wide area network connecting the on-site monitoring computer to the remote computer.

DETAILED DESCRIPTION

Exemplary embodiments of methods and systems that facilitate viewing turbine monitoring system data from a remote location are described in detail below. The methods and systems facilitate, for example, a user at a remote location from a turbine to view real time data generated by a turbine monitoring system. Also, the remote user can view the configuration and settings of the monitoring system from the remote location. Further, if there are problems with the turbine or the monitoring system, the remote user can perform diagnostic evaluations from the remote location without the need of on-site personnel involvement, thereby reducing maintenance costs and times.

Figure 1:
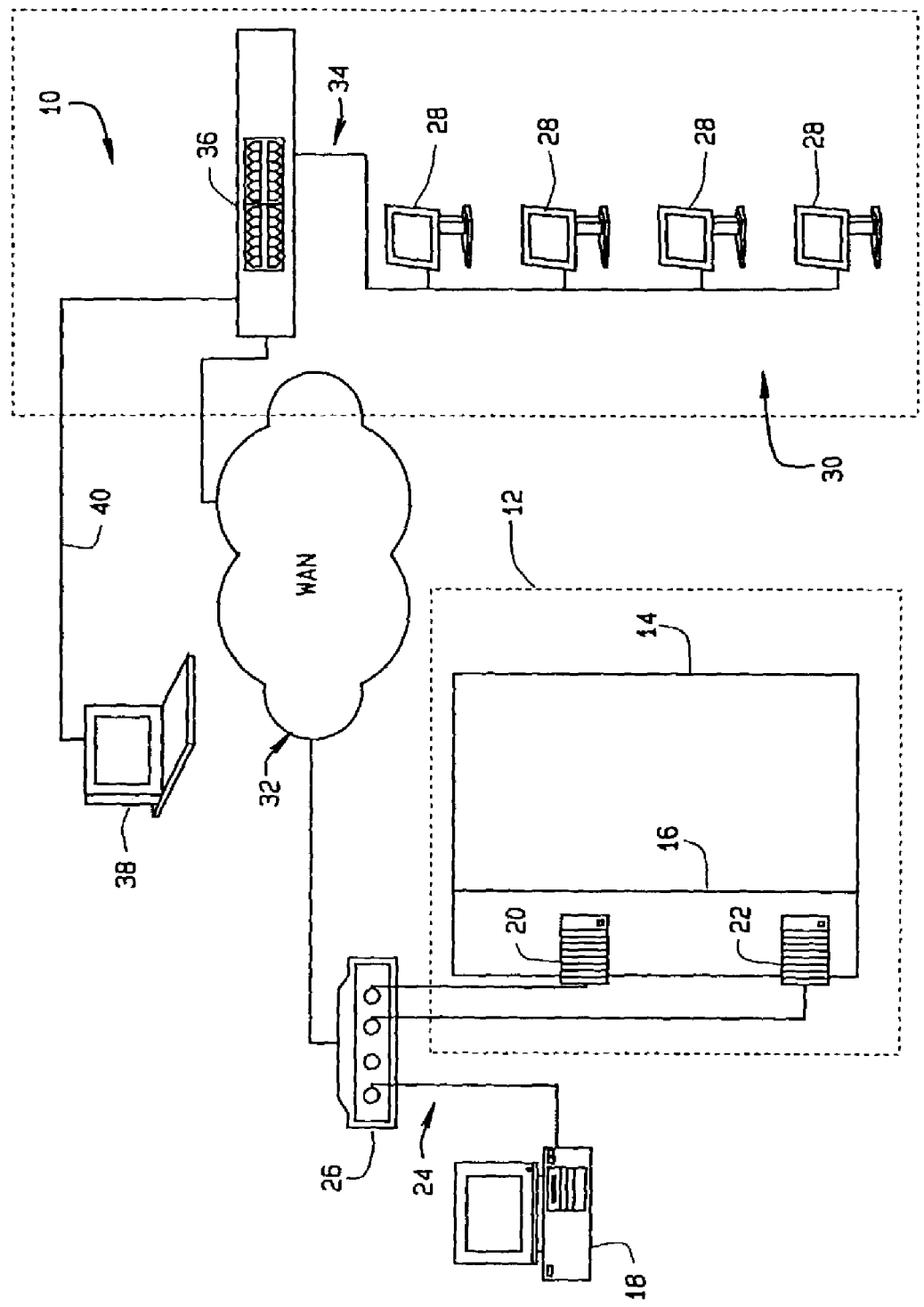
FIG. 1 is schematic representation of a monitoring system in accordance with an embodiment of the present invention.

Referring to the drawings, FIG. 1 is schematic representation of a monitoring system 10 in accordance with an exemplary embodiment of the present invention. System 10 facilitates monitoring a turbine (not shown) located, for example, at a power plant. System 10 includes a turbine monitoring apparatus 12 that is controlled by a programmable logic controller 14 that includes an interface rack 16. Turbine monitoring apparatus 12 can be any type of turbine monitoring apparatus that is configured to monitor a plurality of turbine parameters from equipment including, but not limited to, vibrational data, operating temperatures, operating speeds, operating pressures, valve and actuator settings, fuel demand, power generation, operational setting percentages, alarms, and operating states and conditions.

An on-site monitoring computer 18 is operatively connected to interface rack 16 through communications gateway cards 20 and/or 22 by a local area network 24 that includes a hub 26. On-site monitoring computer 18 is physically located at the same location as the turbine that is being monitored and is useful for facilitating the examination and analysis of data produced by turbine monitoring apparatus 12. Communication gateway cards 20 and 22 can be any suitable communications card, for example Ethernet/485 communication gateway cards. Also, Communication gateway cards 20 and 22 can be configured to interface with a T1 line an/or a T2 line.

To enable workers/users 28 at a location 30 remote from the turbine location to view the data produced by monitoring apparatus 12, on-site monitoring computer 18 is operatively connected to a wide area network 32 through hub 26. Remote user computers 28 are networked together by a local area network 34 which is operatively connected to wide area network 32 by a router 36. Also, a user computer 38 that is remote from local area network 34 can access local area network 34 by a virtual private network 40 operatively connected to router 36.

The communications topology described above permits remote users 28 and 38 to view turbine data at interface rack 16 in real time. This communications topology also permits users 28 and 30, with the appropriate authorization, to make configuration changes to interface rack 16 from an off site location.

Figure 2:
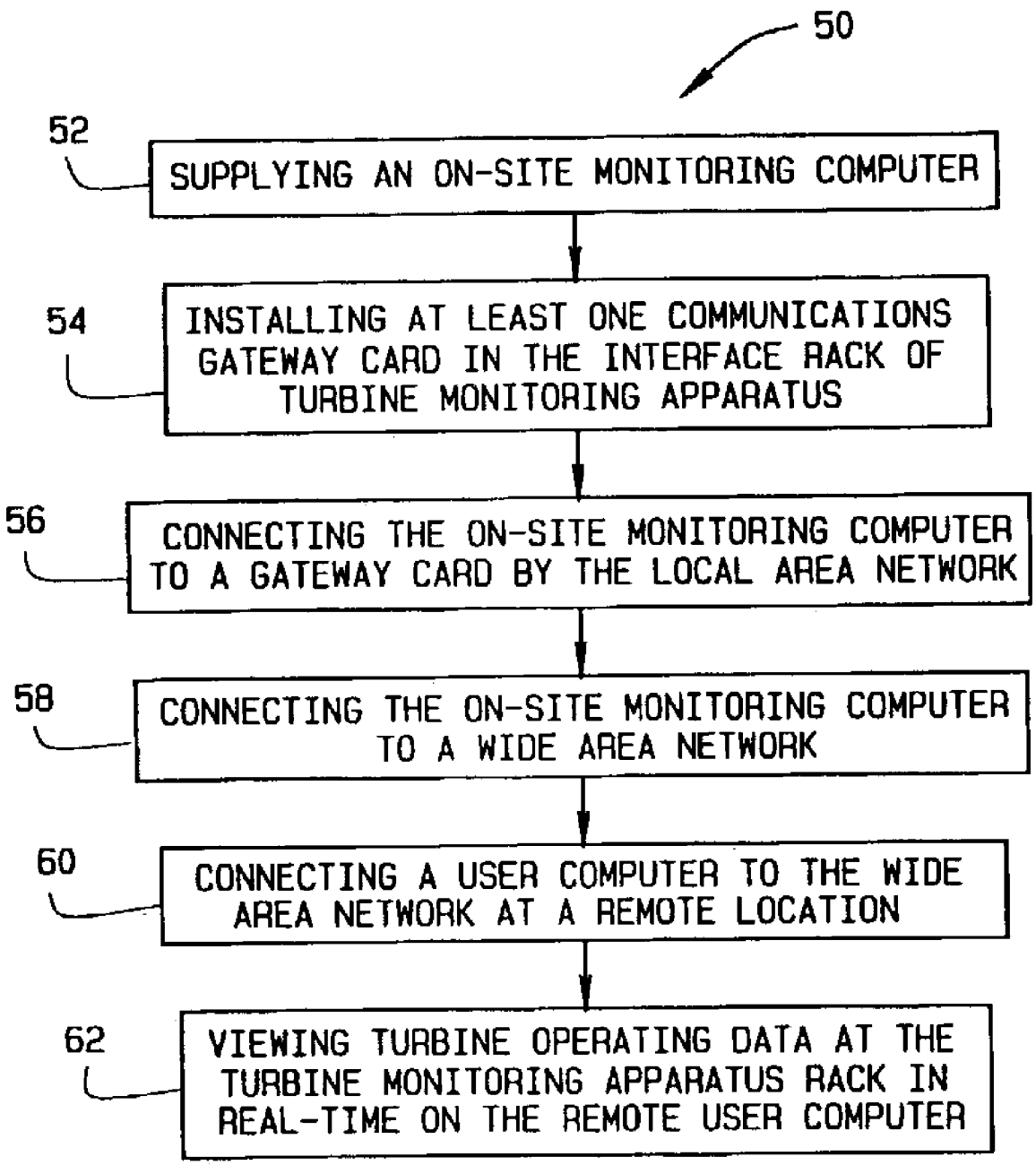
FIG. 2 is a flow chart of a method of viewing data of a turbine monitoring system in real-time from a remote location.

FIG. 2 is a flow chart of a method 50 of viewing data of turbine monitoring apparatus 12 in real-time from remote location 30. Method 50 includes supplying 52 an on-site monitoring computer 18, installing 54 at least one communications gateway card 20 in interface rack 16 of turbine monitoring apparatus 12, connecting 56 on-site monitoring computer 18 to gateway card 20 by local area network 24 and connecting 58 on-site monitoring computer 18 also to wide area network 32.

Method 50 also includes connecting 60 a user computer 28 to wide area network 34 at a location 30 remote from turbine monitoring apparatus 12, and viewing 62 turbine operating data, captured by turbine monitoring apparatus 12, at turbine monitoring apparatus rack 16 in real-time, on user computer 28.

While the invention has been described in terms of various specific embodiments, those skilled in the art will recognize that the invention can be practiced with modification within the spirit and scope of the claims.

The invention claimed is:

1. A method of viewing data of a turbine monitoring system from a remote location, said method comprising:
   coupling a programmable logic controller (PLC) including an interface rack to the turbine monitoring system;
   supplying an on-site monitoring computer and a remote computer;
   installing at least one communications gateway card in the interface rack of the PLC;
   connecting the on-site monitoring computer to the at least one gateway card by a local area network;
   connecting the on-site monitoring computer and the remote computer to a wide area network; and
   accessing at least turbine operational data and interface rack configuration data using the remote computer.

2. A method in accordance with claim 1 further comprising:
   connecting a user computer to the wide area network at a location remote from the turbine monitoring system; and
   viewing turbine operating data, captured by the turbine monitoring system, at the turbine monitoring system rack in real-time, on the user computer.

3. A method in accordance with claim 1 wherein connecting the on-site monitoring computer to the at least one gateway card comprises:
   connecting the on-site monitoring computer to a hub; and
   connecting the hub to the at least one gateway card.

4. A method in accordance with claim 3 wherein connecting the on-site monitoring computer also to a wide area network comprises connecting the hub to the wide area network.

5. A method in accordance with claim 1 wherein installing at least one communications gateway card in the interface rack comprises installing a first and a second communications gateway card in the interface rack, the first gateway card configured to communicate with a T1 line and the second gateway card configured to communicate with a T2 line.

6. A method in accordance with claim 1 further comprising performing a turbine diagnostic evaluation using the remote computer.

7. A method in accordance with claim 1 further comprising controlling a configuration of the interface rack using the remote computer.

8. A method in accordance with claim 1 further comprising controlling an operation of the turbine using the remote computer.

9. A method in accordance with claim 1 wherein accessing at least turbine operational data and interface rack configuration data using the remote computer further comprises accessing at least real-time turbine operational data and real-time interface rack configuration data using the remote computer.

10. A method in accordance with claim 1 wherein connecting the on-site monitoring computer and the remote computer to a wide area network further comprises connecting the remote computer to a virtual private network that is operatively coupled to the wide area network.

11. A method of viewing data of a turbine monitoring system from a remote location, the turbine monitoring system comprising a programmable logic controller having an interface rack, said method comprising:
    creating turbine operating data by the turbine monitoring system;
    creating interface rack configuration data by the programmable logic controller;
    transmitting the operating data to an on-site monitoring computer in real-time via a local area network that connects the on-site monitoring computer to the interface rack of the turbine monitoring system;
    transmitting the operating data and the interface rack configuration data to a remote computer by the on-site monitoring system in real-time via a wide area network that connects the on-site monitoring computer to the remote computer; and
    viewing the transmitted data at the remote computer.

12. A method in accordance with claim 11 wherein transmitting the operating data to an on-site monitoring computer companies:
    installing at least one communications gateway card in the interface rack; and
    connecting the on-site monitoring computer to the at least one gateway card by the local area network.

13. A method in accordance with claim 12 wherein connecting the on-site monitoring computer to the at least one gateway comprises:
    connecting the on-site monitoring computer to a hub; and
    connecting the hub to the at least one gateway card.

14. A method in accordance with claim 13 wherein transmitting the operating data to a remote computer by the on-site monitoring system comprises connecting the on-site monitoring computer also to the wide area network.

15. A method in accordance with claim 14 wherein connecting the on-site monitoring computer also to the wide area network comprises connecting the hub to the wide area network.

16. A method in accordance with claim 12 wherein installing at least one communications gateway card in the interface rack comprises installing a first and a second communications gateway card in the interface rack, the first gateway card configured to communicate with a T1 line and the second gateway card configured to communicate with a T2 line.

17. A system that facilitates viewing data of a turbine monitoring apparatus from a remote location, the turbine monitoring apparatus comprising a programmable logic controller having an interface rack, said system comprising:
    an on-site monitoring computer;
    a remote computer;
    at least one communications gateway card mounted in said interface rack of said programmable logic controller and configured to communicate with the turbine monitoring apparatus;
    a local area network connecting the on-site monitoring computer to the at least one gateway card; and a wide area network connecting the on-site monitoring computer to the remote computer, the remote computer configured to receive at least turbine operational data and interface rack configuration data via the wide area network.

18. A system in accordance with claim 17 further comprising a hub connecting said on-site monitoring computer to said local area network and said wide area network.

19. A system in accordance with claim 17 wherein said at least one communications gateway card comprises a first and a second communications gateway card, the first gateway card configured to communicate with a T1 line and the second gateway card configured to communicate with a T2 line.

* * * * *

UNITED STATES PATENT AND TRADEMARK OFFICE
CERTIFICATE OF CORRECTION

| | | |
|---|---|---|
| PATENT NO. | : 7,299,279 B2 | Page 1 of 1 |
| APPLICATION NO. | : 10/248239 | |
| DATED | : November 20, 2007 | |
| INVENTOR(S) | : Sadaghiany | |

It is certified that error appears in the above-identified patent and that said Letters Patent is hereby corrected as shown below:

In Claim 12, column 4, line 29, delete "companies:" and insert therefor --comprises:--.

Signed and Sealed this

Twenty-second Day of December, 2009

David J. Kappos
*Director of the United States Patent and Trademark Office*